United States Patent [19]
Tokoro

[11] Patent Number: 6,124,823
[45] Date of Patent: Sep. 26, 2000

[54] RADAR APPARATUS FOR VEHICLE

[75] Inventor: Setsuo Tokoro, Susono, Japan

[73] Assignee: Toyota Jidosha Kabushiki Kaisha, Aichi-ken, Japan

[21] Appl. No.: 09/345,446

[22] Filed: Jul. 1, 1999

[30] Foreign Application Priority Data

Jul. 3, 1998 [JP] Japan .................................. 10-188926

[51] Int. Cl.[7] .................................................. G01S 13/93
[52] U.S. Cl. ............................................ 342/70; 342/128
[58] Field of Search ................................. 342/70, 71, 72, 342/128; 367/99, 101, 909; 340/903, 511, 904

[56] References Cited

U.S. PATENT DOCUMENTS 5,341,144   8/1994   Stove .......................................... 342/70
5,982,321  11/1999   Iihoshi et al. .............................. 342/70

FOREIGN PATENT DOCUMENTS 1-169386    7/1989   Japan .
6-331742   12/1994   Japan .
7-140248    6/1995   Japan .
9-211108    8/1997   Japan .

*Primary Examiner*—Ian J. Lobo
*Attorney, Agent, or Firm*—Finnegan, Henderson, Farabow, Garrett & Dunner, L.L.P.

[57] ABSTRACT

A radar apparatus of the present invention is a radar apparatus for detecting an object around a vehicle, which comprises a transmitter section for radiating a frequency-modulated, transmitted wave a receiver section for receiving a radio wave re-radiated from an object exposed to the transmitted wave and mixing the radio wave received with part of the transmitted wave to obtain beat signals, and a signal processing section for analyzing frequencies of the beat signals to detect the object around the vehicle. This radar apparatus is arranged to set a first threshold value and a second threshold value higher than the first threshold value as to signal levels of a frequency spectrum of the beat signals. The signal processing section is arranged to detect the object around the vehicle, using a beat frequency of a signal level over the second threshold value, and to compare the frequency spectrum with the first threshold value in a predetermined frequency range to determine whether there is dirt on the transmitter section or on the receiver section.

8 Claims, 4 Drawing Sheets

RADAR APPARATUS FOR VEHICLE

BACKGROUND OF THE INVENTION

1. Field of the Invention

The present invention relates to a radar apparatus for vehicle and, more particularly, to a radar apparatus that can detect dirt deposited on a transmitter or on a receiver.

2. Related Background Art

The radar apparatus for vehicle is inevitably used under circumstances where the dirt such as snow or mud is apt to be deposited on the transmitter or on the receiver thereof. If such dirt is left as it is, object recognition will be hindered; therefore, there have been efforts to develop the radar apparatus capable of detecting the dirt on the transmitter or on the receiver.

A typical example of the radar apparatus capable of detecting the dirt on the transmitter or on the receiver is the "Ultrasonic sensor device for on-vehicle use" disclosed in Japanese Laid-open Patent Application No. 6-331742. This conventional technology is to detect the dirt, based on a detecting state of the road surface.

In the above-stated conventional technology, however, different transmitted/received beam patterns are used by switching between occasions when a primary target is desired to be detected and when the dirt on the transmitter or on the receiver is desired to be detected.

This makes longer detection cycles of the object primarily desired to detect and the conventional technology is thus inappropriate for monitoring the objects under change in conditions within a short time. This means that there is the limit to increase in the time resolution for detecting preceding cars and obstacles during driving of vehicle and the conventional technology is thus poor in practical utility as a radar apparatus for vehicle.

SUMMARY OF THE INVENTION

The radar apparatus for vehicle according to the present invention has been accomplished in order to solve the above problem. The radar apparatus for vehicle of the present invention is a radar apparatus for detecting an object around a vehicle, the radar apparatus comprising a transmitter section for radiating a transmitted wave frequency-modulated, a receiver section for receiving a radio wave re-radiated from an object exposed to the transmitted wave and mixing the radio wave received with part of the transmitted wave to obtain beat signals, and a signal processing section for analyzing frequencies of the beat signals to detect the object around the vehicle, wherein a first threshold value and a second threshold value higher than the first threshold value are set as to signal levels of a frequency spectrum of the beat signals and wherein the signal processing section is arranged to carry out detection of the object around the vehicle, using a beat frequency of a signal level over the second threshold value and to compare the frequency spectrum with the first threshold value in a predetermined frequency range to determine whether there is dirt on the transmitter section or on the receiver section.

The driving road surface is one of the objects that re-radiate the transmitted wave. However, reception levels of signals reflected by the road surface and returning to the receiver section (road-reflected signals) are lower than an average reception level of signals reflected from the objects primarily intended to be detected, such as the preceding vehicles or obstacles. Therefore, the second threshold value is set higher than an average beat signal level of the road-reflected signals, whereby accurate detection can be done with removing the beat signals caused by the road-reflected signals, which are noise in the detection of object.

On the other hand, the first threshold value is set lower than the average level of beat signals based on the road-reflected signals, whereby the apparatus can always receive waves of beat signal levels over the first threshold value during driving of the vehicle as long as the dirt such as snow, mud, or the like is not deposited on the transmitter section or on the receiver section. In other words, it can be determined that the received signal levels are lowered by the dirt, if there scarcely appear beat frequencies of levels over the first threshold value within a predetermined period.

In addition, the range of beat frequencies is limited in this dirt determination. Therefore, even if outside the frequency range many beat frequencies of levels over the first threshold value are detected because of factors except for the road-reflected signals, a judgment of presence of dirt can be made, if there scarcely appear beat frequencies of levels over the first threshold value in the aforementioned frequency range within the predetermined period. Namely, a failure in the judgment of dirt, caused by internal noise, can be avoided by comparing the beat frequencies in the limited frequency range in which the internal noise etc. is unlikely to occur, with the first threshold value.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
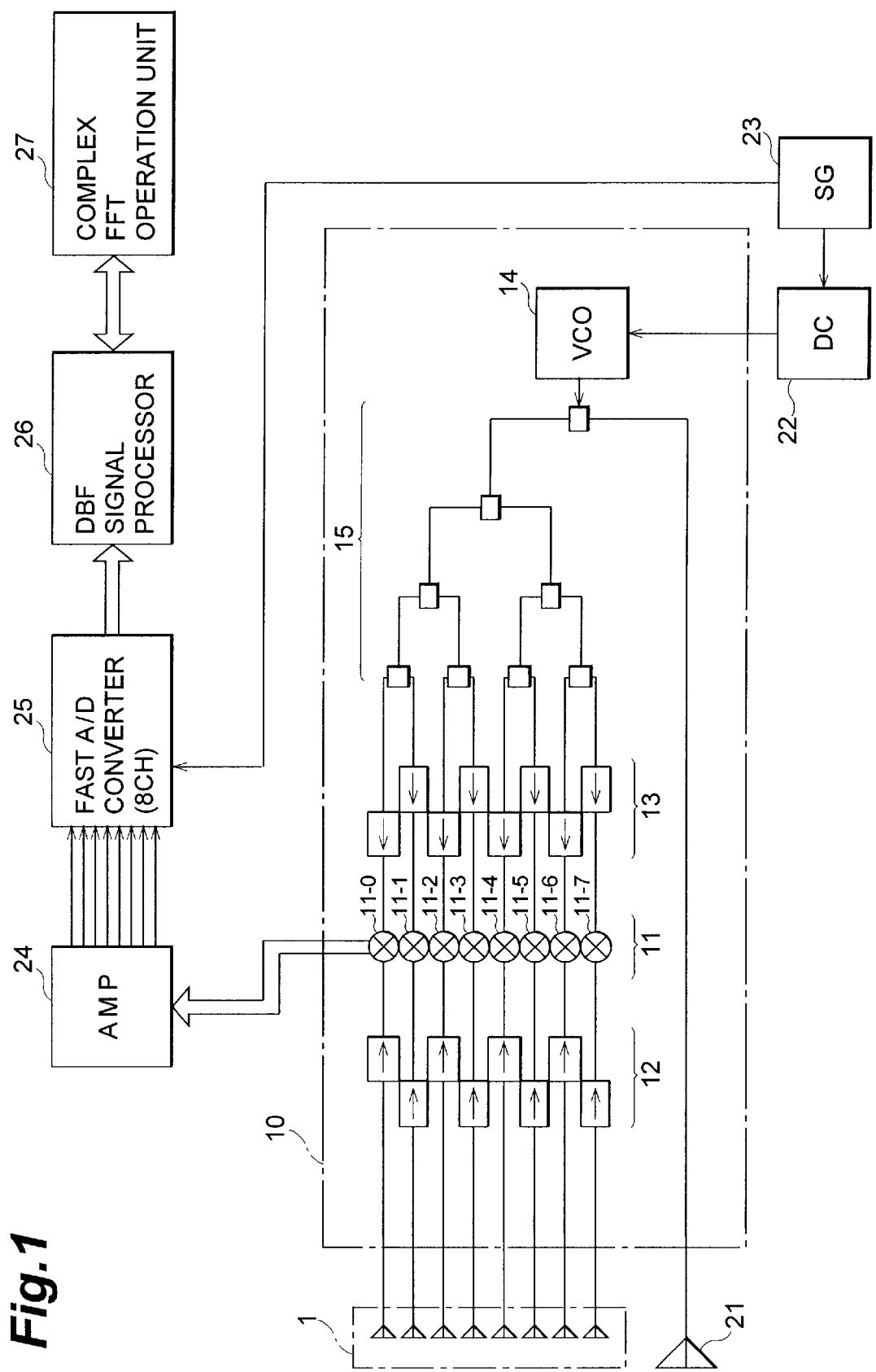
FIG. 1 is a structural diagram to show an embodiment of the radar apparatus for vehicle according to the present invention.

FIG. 1 shows the structure of the radar apparatus for vehicle as an embodiment of the present invention. This radar apparatus is an FM-CW radar apparatus using the transmitted signal resulting from frequency modulation (FM) of continuous wave (CW) and DBF radar apparatus for carrying out digital beam forming operation.

An array antenna 1 for reception has eight antenna elements corresponding to respective channels. The antenna elements are connected via individual isolators composing an isolator group 12 to a respectively corresponding mixers 11-0 to 11-7.

The mixers 11-0 to 11-7 are arranged each to mix the received signal arriving at each antenna element with part of the transmitted signal to obtain a beat signal. Transmitted signal components supplied as local signals to the mixers 11-0 to 11-7 are supplied from a voltage-controlled oscillator (VCO) 14 via a branch circuit 15 and an isolator group 13.

The oscillator 14 is a varactor control type Gunn oscillator having the center frequency of f0 (for example, 60 GHz), which outputs a triangular modulated signal in the range of f0±ΔF/2, based on control voltage outputted from a dc power supply 22 for modulation. This triangular modulated signal is supplied via the branch circuit 15 to a transmitter antenna 21 to be radiated as a transmitted signal and is also branched into eight channels as local signals, as described above, to be mixed respectively with the received signals in the eight channels in the respective mixers 11-0 to 11-7 to generate beat signals of the respective channels. The dc power supply 22 changes its output voltage values in a triangular pattern on a periodic basis and at the frequency of several hundred Hz under control of a signal source 23 for modulation.

At the post end of the high-frequency circuit 10 composed of the mixer group 11, the isolator groups 12, 13, the oscillator 14, and the branch circuit 15, there are provided a low-noise amplifier 24, a fast A/D converter 25, a DBF signal processing unit 26, and a complex FFT operation unit 27.

The low-noise amplifier (amp) 24 amplifies the beat signals of the eight channels outputted from the mixers 11-0 to 11-7 in parallel. The amp 24 incorporates a low-pass filter having the cut-off frequency of 77 kHz for antialiasing.

The fast A/D converter 25 is a circuit for effecting A/D conversion of the beat signals of the eight channels in parallel and simultaneously, which samples the signals at 200 kHz. At this sampling frequency the converter 25 performs sampling at 128 points in each of frequency-increasing interval (up interval) and frequency-decreasing interval (down interval) of frequency-modulated (FM) triangular wave.

The DBF signal processing unit 26 acquires digital beat signals of the respective channels from the fast A/D converter 25 and performs the DBF operation and calculation of distance and speed to carry out a recognition operation of a target (object).

The DBF signal processing unit 26 judges whether there is the dirt due to snow or mud on the transmitter antenna 21 and on the receiver antenna 1, according to procedures described hereinafter.

The complex FFT operation unit 27 is an operation unit for carrying out the complex FFT operation among a series of operations in the DBF signal processing section 26 in place thereof. The complex FFT operation unit 27 receives the digital beat signals of the respective channels from the DBF signal processing unit 26, performs the complex FFT operation therewith, and sends the result back to the DBF signal processing unit 26.

Figure 2:
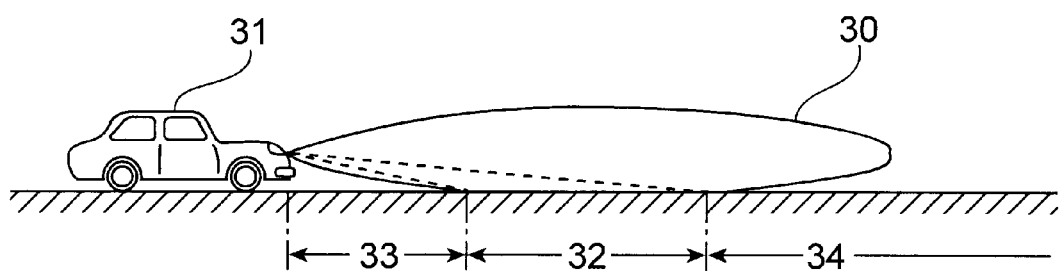
FIG. 2 is a conceptual diagram to show a detection range of the radar apparatus for vehicle.

This radar apparatus is mounted, for example, in the front part of a vehicle and is used for recognition of a preceding vehicle. FIG. 2 is a diagram to show an object detecting area when this radar apparatus is mounted on a vehicle 31. As seen from this figure, the detecting area 30 is set so as to include the road surface 32 in a predetermined range ahead the vehicle 31. This predetermined range is normally a range excluding a near range 33 and a far range 34.

Figure 3:
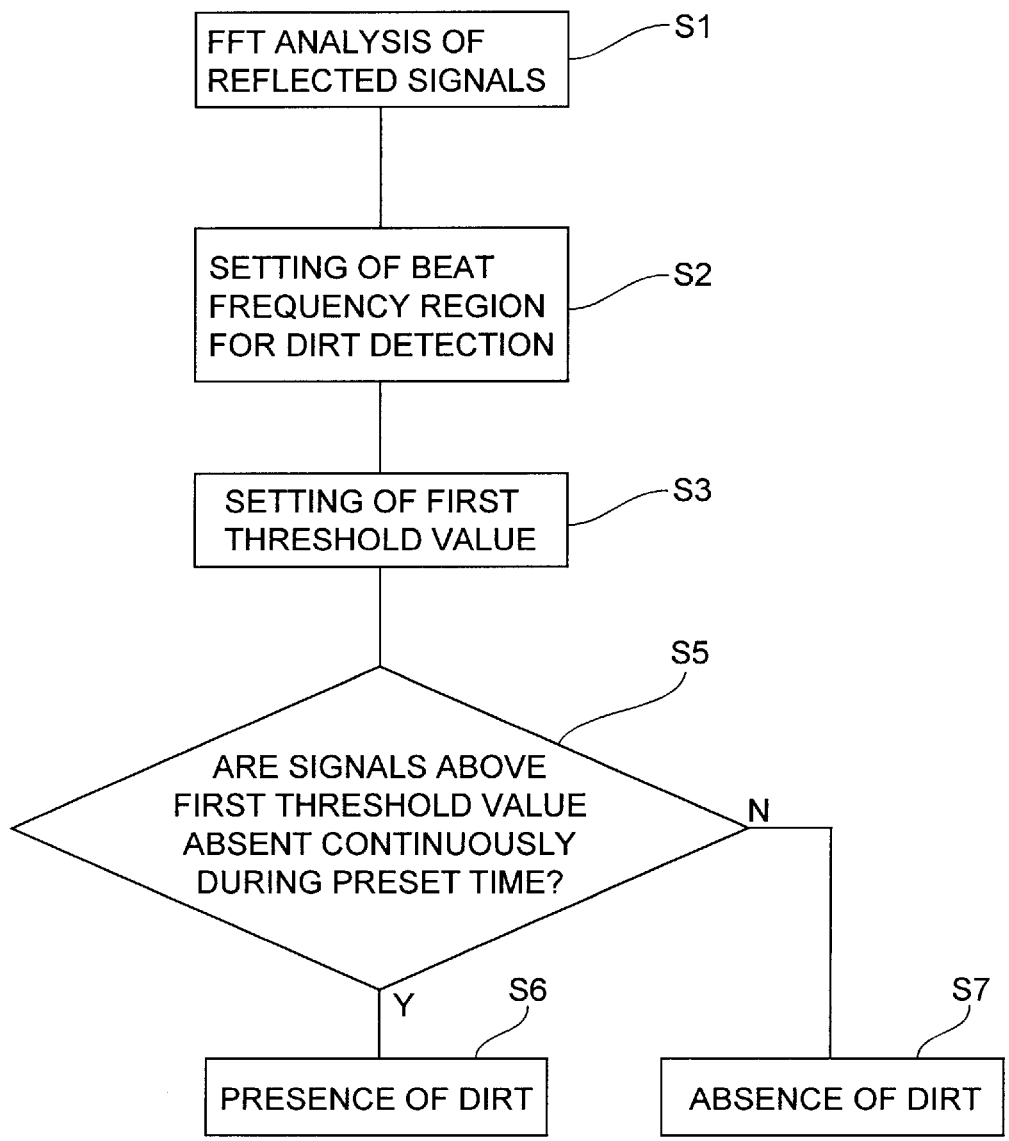
FIG. 3 is a flowchart to show procedures of operation in the present embodiment.
Figure 4:
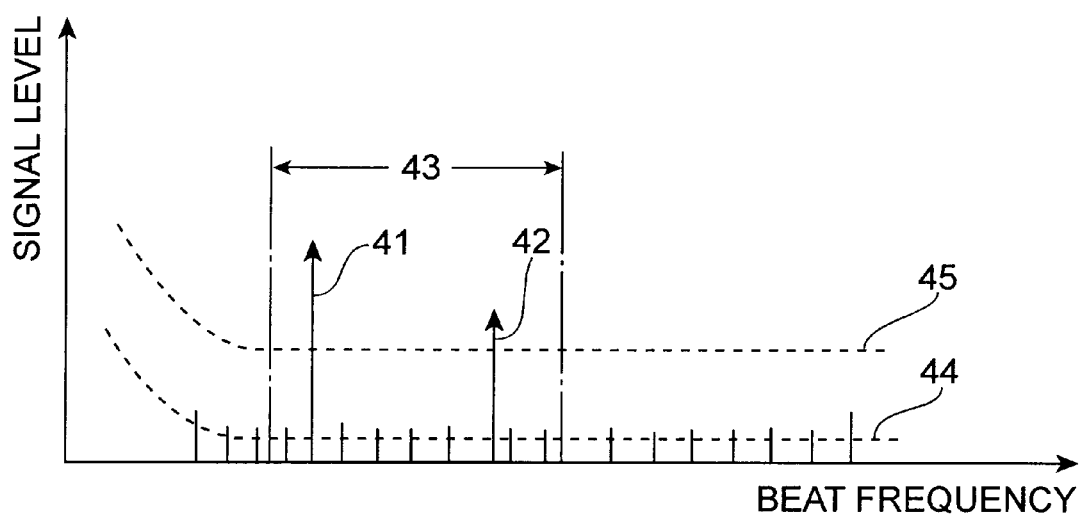
FIG. 4 is a graph to show the result of FFT analysis in the present embodiment.

FIG. 3 is a flowchart concerning the dirt judgment in the DBF signal processing unit 26. First, step S1 is to perform the FFT analysis of reflected signals. FIG. 4 is a graph to show an example of the result of the FFT analysis in an up interval or in a down interval, i.e., an example of a frequency spectrum of beat signals. The abscissa represents beat frequencies and the ordinate signal levels.

In this figure, arrows 41 and 42 indicate reflected signals from primary targets, for example, from preceding vehicles. Short, vertical line segments present throughout the almost entire region of beat frequencies represent signals reflected by the road surface and the internal noise. As seen from the lengths of the line segments, they have very low signal levels, as compared with the reflected signals from the primary targets.

Next, step S2 is to set a beat frequency range 43 used in the dirt detection. The judgment of dirt is made according to presence or absence of the beat signals based on the road-reflected signals. Specifically, the road-reflected signals are always received as long as the detecting area of the radar apparatus is set as illustrated in FIG. 2; therefore, it can be determined that there is the dirt on the transmitter section or on the receiver section, if the signal levels of the road-reflected signals are lowered. In this example, therefore, a beat frequency region in which the beat signals based on the road-reflected signals can appear is set as the beat frequency region used in the dirt detection.

A variety of standards can be considered for setting of the frequency region; for example, the frequency region 43 can be determined according to the vehicle speed.

In the FM-CW radar apparatus, a beat frequency is determined by relative velocity and distance of an object. On the other hand, the relative velocity of the road surface is nothing but the velocity of the vehicle on which this radar apparatus is mounted. Further, distances to the road surface are determined by the range of the detecting area, as shown in FIG. 2. The beat frequency region in which the road-reflected signals can appear is thus obtained from the vehicle velocity information supplied from the main body of the vehicle and the detected road distances determined based on the setting of the detecting area and it can be used as the beat frequency region 43 for detection of dirt.

Next, step S3 is to set the first threshold value for the dirt judgment. In the frequency region 43 for the dirt detection, the first threshold value 44 is set as a value a little lower than an average signal level of the beat signals based on the road-reflected signals with absence of dirt on the transmitter/receiver. This threshold value 44 is set lower than the second threshold value 45 for detection of primary targets. Further, the first threshold value 44 is set higher than an average of electrical noise levels inside the apparatus, including thermal noise.

Next, step S5 is to determine whether the beat signals of the signal levels over the first threshold value in the dirt detection frequency region 43 are continuously absent during a predetermined period of time.

When step S5 is affirmed, that is, when it is determined that the beat signals of signal levels over the first threshold value are continuously absent during the predetermined period, the flow goes to step S6 to give a warning display or the like to indicate the presence of dirt on the transmitter section or on the receiver section. If step S5 is negated to the contrary, the flow goes to step S7 to make a judgment of the absence of dirt and carry on the object detecting operation.

The present embodiment includes the determination in step S5 to determine whether the beat signals of the signal levels over the first threshold value are continuously absent during the predetermined period, but, instead thereof, the apparatus may also be arranged to determine whether member of beat signals having the signal levels over the first threshold value becomes not more than a predetermined value continuously during the predetermined period. In this arrangement, the judgment of the presence of dirt is made in the affirmative case and the warning display or the like is given on that occasion, too. This determination criterion permits determination of the presence of dirt even if a strong reflected signal from a primary target is received and the signal level of the signal exceeds the first threshold value 44, in spite of the presence of dirt.

If the primary target is another vehicle running ahead, it can be discriminated definitely from the road surface because of the difference of relative speed. Namely, it is possible to exclude the reflected wave from the running object from those subjected to the determination in step S5.

The first threshold value can be set to different values according to the beat frequencies. Since the intensities of reflected signals are normally higher in the near distance range or in the low beat frequency region than in the far distance range or in the high beat frequency region, it is desirable to set the first threshold value higher in the low frequency region according thereto.

It is also desirable to make the first threshold value variable according to transmission output values in order to enhance the accuracy. It is needless to mention that the first threshold value is set larger with larger transmission output values.

A sufficient condition is that the dirt determination of the present embodiment is carried out in either an up interval or a down interval, but determinations in the both intervals may also be combined and a warning is given only if the both determinations result in the presence of dirt. This arrangement can enhance the reliability of the determination.

As described above, since the radar apparatus for vehicle according to the present invention is arranged to set the different threshold values for the detection of target and for the dirt detection and to set the beat frequency range used for the dirt detection, the detection of dirt on the transmitter section or on the receiver section can be carried out without degradation of accuracy for the target detecting operation and without increase of processing time.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A radar apparatus for detecting an object around a vehicle, said radar apparatus comprising a transmitter section for radiating a frequency-modulated transmitted wave, a receiver section for receiving a radio wave re-radiated from an object exposed to said transmitted wave and mixing said radio wave received with part of said transmitted wave to obtain beat signals, and a signal processing section for analyzing frequencies of said beat signals to detect said object around the vehicle, wherein a first threshold value and a second threshold value higher than said first threshold value are set as to signal levels of a frequency spectrum of said beat signals, and wherein said signal processing section is arranged to detect said object around the vehicle, using a beat frequency of a signal level over said second threshold value, and to compare said frequency spectrum with said first threshold value in a predetermined frequency range to determine whether there is dirt on said transmitter section or on said receiver section.

2. The radar apparatus for vehicle according to claim 1, wherein said signal processing section determines that there is dirt on said transmitter section or on said receiver section when the number of beat frequencies of signal levels over said first threshold value in said predetermined frequency range is not more than a predetermined value in a predetermined time.

3. The radar apparatus for vehicle according to claim 1, wherein said signal processing section determines that there is dirt on said transmitter section or on said receiver section when a beat frequency of a signal level over said first threshold value in said predetermined frequency range is absent in a predetermined time.

4. The radar apparatus for vehicle according to claim 1, wherein said first threshold value is set higher than an average of electric noise levels inside the apparatus.

5. The radar apparatus for vehicle according to claim 1, wherein said first threshold value is set higher in a low frequency region than in a high frequency region.

6. The radar apparatus for vehicle according to claim 1, wherein said first threshold value is variable according to a predetermined condition.

7. The radar apparatus for vehicle according to claim 6, wherein said predetermined condition is a transmission output.

8. The radar apparatus for vehicle according to claim 1, wherein said predetermined frequency range is determined according to speed of the vehicle.

* * * * *

UNITED STATES PATENT AND TRADEMARK OFFICE
CERTIFICATE OF CORRECTION

PATENT NO.: 6,124,823

DATED: September 26, 2000

INVENTOR(S): Setsuo TOKORO

It is certified that an error appears in the above-identified patent and that said Letters Patent is hereby corrected as shown below:

Title page, Item [57], in the Abstract, line 4, after "modulated", delete "," and after "transmitted wave", insert --,--.

Signed and Sealed this

Eighth Day of May, 2001

Attest:

NICHOLAS P. GODICI

Attesting Officer     Acting Director of the United States Patent and Trademark Office